3 Sheets—Sheet 1.

G. W. BAKER.

Lubricator for Steam Valves of Locomotives.

No. 9,536. Reissued Jan. 18, 1881.

WITNESSES—
F. B. Townsend
C. M. Freeman

INVENTOR—
George W. Baker
By S. B. Coupland & Co.
Attys.

N. PETERS, PHOTO-LITHOGRAPHER, WASHINGTON, D. C.

3 Sheets—Sheet 2.

G. W. BAKER.

Lubricator for Steam Valves of Locomotives.

No. 9,536. Reissued Jan. 18, 1881.

WITNESSES—
F. B. Townsend
D. M. Freeman

INVENTOR—
George W. Baker
By S. B. Coupland & Co
attys.

N. PETERS, PHOTO-LITHOGRAPHER, WASHINGTON, D. C.

G. W. BAKER.

Lubricator for Steam Valves of Locomotives.

No. 9,536. Reissued Jan. 18, 1881.

WITNESSES.

F. B. Townsend

L. M. Freeman.

INVENTOR.

Geo. W. Baker

By L. B. Coupland & Co.

Attys.

N. PETERS, PHOTO-LITHOGRAPHER, WASHINGTON, D. C.

UNITED STATES PATENT OFFICE.

GEORGE W. BAKER, OF CHICAGO, ILLINOIS.

LUBRICATOR FOR STEAM-VALVES OF LOCOMOTIVES.

SPECIFICATION forming part of Reissued Letters Patent No. 9,536, dated January 18, 1881.

Original No. 227,199, dated May 4, 1880. Application for reissue filed November 24, 1880.

*To all whom it may concern:*

Be it known that I, GEORGE W. BAKER, of Chicago, in the county of Cook and State of Illinois, have invented certain new and useful Improvements in Lubricators for Steam-Valves of Locomotives; and I do hereby declare the following to be a full, clear, and exact description of the invention, that will enable others skilled in the art to which it appertains to construct and operate the same, reference being had to the accompanying drawings, and to letters of reference marked thereon, forming a part of this specification.

This invention relates to that class of lubricators designed to lubricate the interior working parts of steam-engines; and it consists of certain novel features and arrangement of the parts, as will be hereinafter more fully set forth and described in detail.

When used in connection with locomotive-engines the oil-reservoir is attached to the boiler at a point inside of the cab, and an oil-conducting pipe leads from thence under the jacket of the boiler to the steam-chest of the engine. In such cases two devices are used, one on each side of the boiler.

This lubricating apparatus is operated by steam-pressure taken direct from the boiler, the steam passing into the space between the two valves mingling with the oil or lubricant contained therein and injecting the same into the parts to be lubricated. Hence the lubrication can be effected whether the engine is moving or not.

Figure 1:
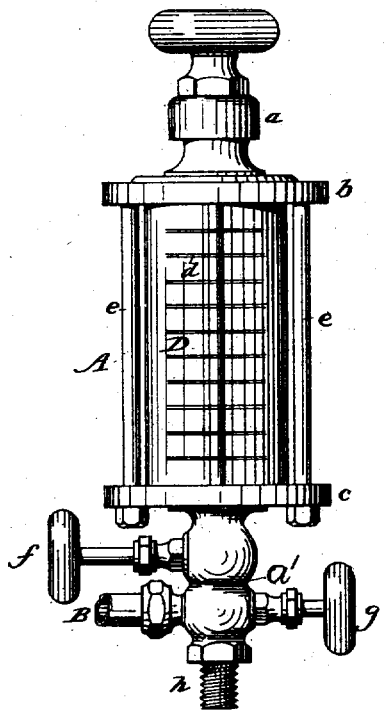
Figure 2:
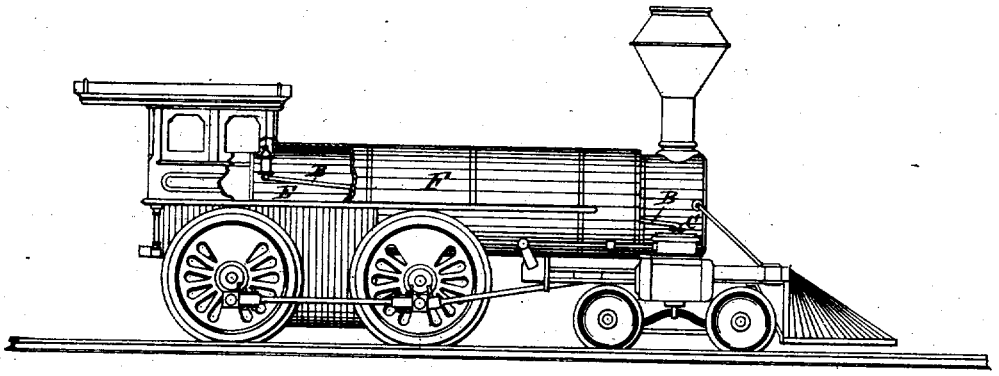
Figure 3:
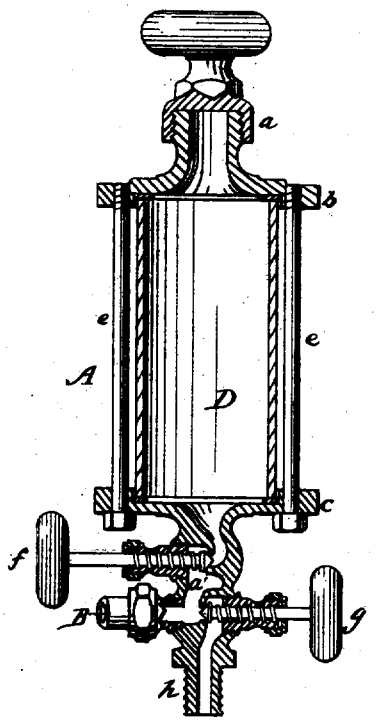

My device is illustrated in the accompanying drawings as follows:

Figure 1 is a front elevation of the oil-reservoir. Fig. 2 is a side elevation of a locomotive with parts broken away, showing the position of the oil-reservoir when used in connection with a locomotive-engine. Fig. 3 is a central vertical section of the device shown by Fig. 1.

Referring to the drawings, A represents the oil-cup; B, the oil-conducting pipe leading to the valve-chamber; C, the steam-chest or valve-chamber. E is the boiler, and F the jacket inclosing the same.

The oil-cup A consists of the following parts, as shown in Fig. 1: D, the oil-reservoir, is made of glass, and is provided with graduation-marks *d*. This oil-reservoir is cylindrical in form, and has its ends closed by the metal ends or disks *b* and *c*, which are clamped to it by the screw rods or bolts *e*. Thus by the parts D *b c* and the bolts *e e e* a close and transparent oil-cup is formed. The upper disk, *b*, is provided with an opening through which oil is supplied to the reservoir. This opening is closed by the screw-cap *a*. The educt is in the lower disk, *c*, and consists of a pipe, *h*, which at its extremity is screw-threaded for connection with the boiler. In the pipe *h* are placed the throttle or regulating valves *f* and *g*, and from the extension of the throttle *g* branches the pipe B, before referred to. The throttle *f* controls the passage opening into the oil-reservoir D, and the throttle *g* closes the connection with the boiler. The lower inclosing end or disk, *c*, has a globular extension cast integral therewith, as shown in Figs. 1 and 3 of the drawings, affording seats for the regulating-valves *f* and *g*, and also forming the intermediate chamber, *a'*, (shown in Fig. 3 of the drawings.)

Placed upon the exterior surface of the transparent oil-reservoir D are the series of lines or graduations *d*, which are arranged in regular order, as shown in Fig. 1 of the drawings. By means of this graduated scale the engineer or operator is enabled to observe at a glance the exact quantity of oil contained in the oil-receptacle, and also to accurately gage the amount of oil being fed out and adjust the regulating-valves accordingly.

The operation of the lubricating device is as follows: First open the valve *f* and allow the space between the valves *f* and *g* to fill with oil. Then close the valve *f* and open the valve *g*. This will cause a current of steam to flow from the boiler through the pipe B and carry the oil with it to the parts to be lubricated. Care must be taken to always close the valve *g* before opening the passage communicating directly with the oil-reservoir, as steam must not be permitted to pass into the same. By proper attention to the valve *f* this will not occur. When the space or intermediate chamber, *a'*, between the valves *f* and *g* is filled with oil and the steam-valve *g* is opened a very little, the oil will be gradually carried to the parts to be lubricated, so that the quantity of oil in the chamber between the two valves will last for some time, and not be discharged all at one time, as would be the case were there no cavity or space to store the oil other than the small recess in the ordinary plug or cock usually employed for the purpose.

The advantages of my device over similar devices heretofore constructed are that by using a transparent oil cup or reservoir and two throttles or globe-valves, with an intermediate chamber, the operator is enabled to draw off a greater or less quantity of oil, as may be required, and in connection with the graduated lines cut into the glass reservoir the operator can see exactly how much oil is being used, while with the ordinary plug or cock the cavity in the plug must be filled and used at each operation.

My invention therefore does not consist in drawing the oil into a passage and driving it to the valve-chamber or cylinder by steam, and thus preventing the steam from entering the oil-reservoir, but in the construction substantially as shown.

Having thus described my invention, what I claim, and desire to secure by Letters Patent, is—

1. A steam-engine-valve-lubricating device consisting of a transparent oil-reservoir, an educt leading from said reservoir to a steam-passage which leads from the boiler to the outer chamber or cylinder of the engine, and two throttles or cocks, one of which is located in the said educt from the oil-reservoir and the other in the said steam-passage at a point between the boiler and the mouth of said educt, each of which throttles operates independently of the other, all being substantially as and for the purpose set forth.

2. The valve-oiling device A, composed of the glass cylinder D, disks *b* and *c*, induct *a*, educt *h*, throttles *f* and *g*, and pipe B, leading to the valve-chamber, constructed, arranged, and operating substantially as and for the purpose set forth.

3. In a lubricating apparatus, the combination, with the transparent oil-reservoir D, provided with a graduated scale, as described, of the lower inclosing end or disk, *c*, having a globular extension cast integral therewith, of the independently-operating regulating-valves *f* and *g* and the intermediate chamber, *a'*, all constructed and arranged to operate as herein set forth.

GEORGE W. BAKER.

Witnesses:
ROBT. FAREN,
J. S. BEANSON.